US008681761B2

(12) United States Patent
Ozawa

(10) Patent No.: US 8,681,761 B2
(45) Date of Patent: Mar. 25, 2014

(54) GATEWAY APPARATUS, METHOD, AND SYSTEM

(75) Inventor: Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 68 days.

(21) Appl. No.: 13/375,501

(22) PCT Filed: Jun. 1, 2010

(86) PCT No.: PCT/JP2010/059267
§ 371 (c)(1),
(2), (4) Date: Dec. 1, 2011

(87) PCT Pub. No.: WO2010/140587
PCT Pub. Date: Dec. 9, 2010

(65) Prior Publication Data
US 2012/0082150 A1    Apr. 5, 2012

(30) Foreign Application Priority Data

Jun. 4, 2009 (JP) ................................. 2009-135213
Jun. 15, 2009 (JP) ................................. 2009-142606

(51) Int. Cl.
*H04W 4/00* (2009.01)
*H04L 12/28* (2006.01)
*H04L 12/56* (2011.01)

(52) U.S. Cl.
USPC ............................ 370/338; 370/329; 370/401

(58) Field of Classification Search
USPC .................................. 370/328, 329, 338, 401
See application file for complete search history.

(56) References Cited

U.S. PATENT DOCUMENTS

| 2002/0046349 | A1* | 4/2002 | Saito | 713/201 |
| 2007/0266163 | A1* | 11/2007 | Xiong et al. | 709/228 |
| 2009/0156213 | A1* | 6/2009 | Spinelli et al. | 455/436 |
| 2009/0323813 | A1* | 12/2009 | Maciel De Faria et al. | 375/240.16 |

FOREIGN PATENT DOCUMENTS

| JP | 2001-217860 A | 8/2001 |
| JP | 2002077274 A | 3/2002 |
| JP | 2004-104450 A | 4/2004 |
| JP | 2004102339 A | 4/2004 |
| JP | 2004-289704 A | 10/2004 |
| JP | 2005303711 A | 10/2005 |
| JP | 2006031337 A | 2/2006 |
| JP | 2006295586 A | 10/2006 |
| JP | 2006352286 A | 12/2006 |
| JP | 2007312148 A | 11/2007 |
| JP | 2008206039 A | 9/2008 |
| JP | 2008283648 A | 11/2008 |

OTHER PUBLICATIONS

International search report for PCT/JP2010/059267 mailed Aug. 17, 2010.
Japanese Office Action for JP2011-518454 mailed on Nov. 6, 2012.
Japanese Office Action for JP2011-518454 mailed on Jan. 29, 2013 with Partial English Translation.
Japanese Office Action for JP2011-518454 mailed on May 21, 2013 with English Translation.

* cited by examiner

*Primary Examiner* — Ronald Abelson
(74) *Attorney, Agent, or Firm* — Sughrue Mion, PLLC

(57) ABSTRACT

A gateway receives a predetermined request from a terminal via a network, identifies the type of the terminal, reads a stream or a file, which includes at least one of a video and an audio, from at least one of an equipment connected directly to the gateway and an equipment connected to the gateway via a network, creates conversion information suitable for the type of the terminal, performs conversion for the stream or the file in accordance with the conversion information, and transmits the converted stream or file to the terminal.

4 Claims, 8 Drawing Sheets

GATEWAY APPARATUS, METHOD, AND SYSTEM

DESCRIPTION OF RELATED APPLICATION

The present invention claims priority from Japanese Patent Application No. 2009-135213 (filed on Jun. 4, 2009) and Japanese Patent Application No. 2009-142606 (filed on Jun. 15, 2009) the content of which is hereby incorporated in its entirety by reference into this specification.

TECHNICAL FIELD

The present invention relates to a gateway, and more particularly to a gateway apparatus, method, and program advantageously applicable to the decoding and display of in-home content by a mobile terminal.

BACKGROUND

Using digital broadcasting, digital high-vision broadcasting, content delivery over a broadband network or NGN (Next Generation Network), or IPTV (Internet Protocol Television), an end user receives content, including video and audio, at home and accumulates the received content in a hard disk recorder or the like in the home.

In addition, an end user accumulates still image content and moving image content taken by the end user himself or herself using a digital camera or a digital video camera. A service is being studied or is supplied on a trial basis to allow not only the end user himself or herself but also limited viewers to view those various types of video content at home and outside the home. For example, a method is proposed to allow a user to view content, which is accumulated in an in-home apparatus compatible with DLNA (Digital Living Network Alliance) described in IEEE CCNC 2008 "Proposal on Wide are DLNA Communication System", pp. 233-237, 2008, directly on a mobile phone outside the home, or to allow specified users to share the content, via a home gateway.

For example, Patent Document 1 (Japanese Patent Kokai Publication No. JP2002-77274A) discloses a home gateway that has the configuration described below to provide a communication system that can protect against an attack from a malicious user of a home network without requiring the home gateway (an in-home gateway) to have an excessively high security function or without requiring the user to perform management usually performed by a specialist. In this configuration, in order to access a communication apparatus on a home network via the Internet, a mobile terminal transmits a message to an access server by specifying an access number corresponding to the home gateway. The access server performs an authentication procedure with the mobile terminal using a method predetermined for the mobile terminal and, when the authentication is successful, transfers a message, via the access network, to the home gateway which corresponds to the specified access number and is installed on the home network. The home gateway, which receives the message from the pre-registered access server, transfers the message to a communication apparatus via the home network. In Patent Document 1, the mobile terminal transmits a message to an access server by specifying the access number corresponding to the home gateway and, when the authentication with the access server is successful, the access server transfers the message to the home gateway corresponding to the access number and installed on the home network. The home gateway converts the message to a protocol supported by a communication apparatus connected to the home network, and transfers the converted message to the communication apparatus. The home gateway performs preset conversion processing for AV data of a predetermined-format received from the communication apparatus and relays the converted AV data to the access server. The preset conversion processing described in this document is code conversion processing for converting the AV data for processing on the access network.

The configuration in which a mobile terminal accesses an in-home apparatus via a home gateway is disclosed, for example, in Patent Document 2 (Japanese Patent Kokai Publication No. JP2006-352286A). In this configuration, when a mobile phone is used to control electrical home appliances (for example, TV, DVD/HDD recorder, air conditioner, lighting fixtures, etc.,) or housing-facility equipments (for example, electrical door lock, several types of sensors, etc.,) connected to a home gateway, the following method is used to provide a highly-secure access technology for preventing an unauthorized access to the home network while reducing the load of the access server that performs authentication. The connection management apparatus authenticates the mobile phone and, when an access from the mobile terminal is permitted, the home gateway communicates, not via the connection management apparatus, but directly with the mobile phone (peer-to-peer communication) to allow the mobile phone to control the in-home apparatuses. In addition, to prevent an unauthorized access, the configuration is disclosed in which the authentication is performed again (second authentication) when the peer-to-peer communication is started. Patent Document 2 describes that the configuration makes it possible to carry out highly secure communication with a home network while reducing the load of the access management server (connection management apparatus), that the configuration can be used for the large-capacity data communication service, for example, the content accumulated in an in-home DVD/HDD recorder can be downloaded to an out-of-home apparatus by controlling the recorder from an out-of-home location, and that the configuration is suitable for preventing an unauthorized access and increasing the security to implement the services.

Patent Document 3 (Japanese Patent Kokai Publication No. JP2007-312148A) discloses a home gateway apparatus that reduces a load of a server, and ensures high security to implement communication adapted to a number of model types of out-of-home apparatuses. The home gateway apparatus, connected to an out-of-home apparatus and an external gateway apparatus via a network, is configured to include a storage unit that stores information on a predetermined apparatus and an access control unit that controls access to the out-of-home apparatus. The access control unit transmits the information on the predetermined apparatus, acquired from the storage unit, to the external gateway apparatus. When the external gateway apparatus determines that the information on the out-of-home apparatus acquired from the out-of-home apparatus corresponds to the information on the predetermined apparatus, the access control unit controls to communicate with the out-of-home apparatus not via the external gateway apparatus.

Patent Document 4 (Japanese Patent Kokai Publication No. JP2008-283648A) discloses an in-home apparatus control system. In this in-home apparatus control system, a femto base station that has a small service area in the home is provided and an in-home apparatus control server stores a registered terminal database that stores information on a terminal ID and the state of each terminal indicating whether the terminal is in or out of the area and a control apparatus database that specifies correspondence between the operation of an in-home apparatus and each terminal location state used as a trigger of the operation. The femto base station transmits the ID of a terminal 1 entering and exiting the area and the entering/exiting information to the server, the server updates the status of the registered terminal database based on the received information and, if the updated state matches a trigger stored in the control apparatus database, controls the in-home apparatus so that the in-home apparatus performs an operation which becomes the same as that stored as an operation corresponding to the trigger.

Patent Document 1:
Japanese Patent Kokai Publication No. JP2002-077274A
Patent Document 2:
Japanese Patent Kokai Publication No. JP2006-352286A
Patent Document 3:
Japanese Patent Kokai Publication No. JP2007-312148A
Patent Document 4:
Japanese Patent Kokai Publication No. JP2008-283648A

SUMMARY

The following gives an analysis of the related technologies of the present invention.

The ability to decode video depends on a terminal such as a mobile phone, a mobile terminal, a game machine, a PC, etc. If at least one of Codec,
  Screen size,
  Bit rate,
  Protocol, and
  File format
differs between the ability of the terminal and that of content accumulated in the home, video content in the home cannot be directly decoded or displayed on various terminals using a conventional method (related art).

For a user to view content, including in-home video, via a network by the user himself or herself, or to allow a specified user other than the user to share in-home content, using the conventional methods, there are the following problems.

The content owner (user himself or herself) must perform the setting operation for the home gateway each time the user wants to do so.

It takes long to perform the setting operation.

It takes long to read the content list or the content.

Patent Document 1 given above does not disclose the configuration of the present invention, which will be described later, in which the gateway identifies the type of a mobile terminal and performs the conversion, suitable for the type of the mobile terminal, for video and audio signals for transmission to the mobile terminal. Patent Document 2 discloses only the configuration for preventing an unauthorized access. The document does not disclose the configuration of the present invention, which will be described later, in which the gateway performs the conversion, suitable for the type of a mobile terminal, for video and audio signals for transmission to the mobile terminal. Patent Document 3 discloses a home gateway that communicates with an out-of-home apparatus not via an external gateway apparatus. This home gateway is fundamentally different from the gateway of the present invention that will be described later. The configuration described in Patent Document 4 is also fundamentally different from that of the present invention that will be described later.

It is an object of the present invention to provide a gateway, method, and system that can decode and display in-home content on various types of terminals according to the ability of the terminals.

It is another object of the present invention to provide a gateway apparatus, method, and system that can decode and display in-home content according to the type of a mobile terminal and eliminate the need for changing the setting each time a content owner himself or herself views in-home content from an out-of-home location or allows a particular user other than the owner to share in-home content.

According to the present invention, there is provided a gateway apparatus that is a gateway installed in a home, the gateway apparatus comprising:
  a conversion unit that,
    when a predetermined request is received from a terminal via a network,
    identifies a type of the terminal,
    reads a stream or a file, which includes at least one of a video and an audio, from at least one of an equipment connected directly to the gateway and an equipment connected to the gateway via a home network,
    creates conversion information suitable for the type of the terminal, and
    performs conversion for the stream or the file, which has been read, in accordance with the conversion information and transmits the converted stream or file to the terminal.

According to the present invention, there is provided a gateway apparatus that is a gateway installed in a home, the gateway comprising a conversion unit that,
  when a predetermined request is received from a terminal via a network and a femto-cell access point installed in the home,
  identifies a type of the terminal and reads a stream or a file, which includes at least one of a video and an audio, from at least one of an equipment connected directly to the gateway and an equipment connected to the gateway via the home network,
  creates conversion information suitable for the type of the terminal, and
  performs conversion for the stream or the file, which has been read, in accordance with the conversion information, and transmits the converted stream or file to the terminal.

According to the present invention, there is provided a gateway method comprising the steps, by a gateway installed in a home, of:
  when a predetermined request is received from a terminal via a network,
  identifying a type of the terminal;
  reading a stream or a file, which includes at least one of a video and an audio, from at least one of an equipment connected directly to the gateway and an equipment connected to the gateway via a home network;
  creating conversion information suitable for the type of the terminal; and
  performing conversion for the stream or the file, which has been read, in accordance with the conversion information and transmitting the converted stream or file to the terminal.

According to the present invention, there is provided a gateway method comprising the steps, by a gateway installed in a home, of:
  when a predetermined request is received from a terminal via a network and a femto-cell access point installed in the home,
  identifying a type of the terminal and reading a stream or a file, which includes at least one of a video and an audio, from at least one of an equipment connected directly to the gateway and an equipment connected to the gateway via the home network;
  creating conversion information corresponding to the type of the terminal; and performing conversion for the stream or the file, which has been read, in accordance with the conversion information, and transmitting the converted stream or file to the terminal.

According to the present invention, there is provided a program that causes a computer, which configures a gateway installed in a home, to perform the processing of:

when a predetermined request is received from a terminal via a network, identifying a type of the terminal;

reading a stream or a file, which includes at least one of a video or an audio, from at least one of an equipment connected directly to the gateway and an equipment connected to the gateway via a home network;

creating conversion information corresponding to the type of the terminal; and performing conversion for the stream or the file, which has been read, in accordance with the conversion information and transmitting the converted stream or file to the terminal.

According to the present invention, there is provided a program that causes a computer, which configures a gateway installed in a home, to perform the processing of:

when a predetermined request is received from a terminal via a network and a femto-cell access point installed in the home, identifying a type of the terminal and reading a stream or a file, which includes at least one of a video or an audio, from at least one of an equipment connected directly to the home gateway and an equipment connected to the home gateway via the home network;

creating conversion information suitable for the type of the terminal; and performing conversion for the stream or the file, which has been read, in accordance with the conversion information and transmitting the converted stream or file to the terminal.

According to another aspect of the present invention, there is provided a gateway apparatus, which is installed on a network, the gateway apparatus comprising:

a conversion unit that, when a predetermined request is received from a mobile terminal via a network that is different from, or the same as, the network, identifies a type of the mobile terminal and transmits the request to a home gateway installed in a home, reads a stream or a file, which includes at least one of a video and an audio, from at least one of an equipment connected directly to the home gateway and an equipment connected to the home gateway via a home network, and creates conversion information corresponding to the type of the mobile terminal, performs conversion for the stream or the file in accordance with the conversion information, and transmits the converted stream or file to the mobile terminal.

According to another aspect of the present invention, there is provided a gateway apparatus, which is installed on a network, the gateway apparatus comprising:

a conversion unit that, when a predetermined request is received from a mobile terminal, identifies a type of the mobile terminal and transmits the request to a wireless home gateway via a femto-cell access point provided in a home, reads a stream or a file, which includes at least one of a video and an audio, from at least one of an equipment connected directly to the home gateway or the set-top box and an equipment connected to the home gateway or the set-top box via a home network, via the wireless home gateway and the femto-cell access point, creates conversion information corresponding to the type of the terminal, and performs conversion for the stream or the file in accordance with the conversion information and transmits the converted stream or file to the mobile terminal.

According to another aspect of the present invention, there is provided a gateway method comprising the steps, by a gateway apparatus installed on a network, of:

when a predetermined request is received from a mobile terminal via a network that is different from, or the same as, the network, identifying a type of the mobile terminal and transmitting the request to a home gateway installed in a home;

reading a stream or a file, which includes at least one of a video and an audio, from at least one of an equipment connected directly to the home gateway and an equipment connected to the home gateway via a home network; and creating conversion information corresponding to at least one of the type of the mobile terminal and characteristics of the network, performing conversion for the stream or the file in accordance with the conversion information, and transmitting the converted stream or file to the mobile terminal.

According to another aspect of the present invention, there is provided a gateway method comprising the steps, by a gateway apparatus installed on a network, of:

when a predetermined request is received from a mobile terminal, identifying a type of the mobile terminal and transmitting the request to a wireless home gateway via a femto-cell access point provided in a home;

reading a stream or a file, which includes at least one of a video and an audio, from at least one of an equipment connected directly to the home gateway or the set-top box and an equipment connected to the home gateway or the set-top box via a home network, via the wireless home gateway and the femto-cell access point;

creating conversion information corresponding to the type of the terminal; and performing conversion for the stream or the file in accordance with the conversion information and transmitting the converted stream or file to the mobile terminal.

According to another aspect of the present invention, there is provided a program that causes a computer, which configures a gateway apparatus installed on a network, to perform the processing of:

when a predetermined request is received from a mobile terminal via a network that is different from, or the same as, the network, identifying a type of the mobile terminal and transmitting the request to a home gateway installed in a home;

reading a stream or a file, which includes at least one of a video and an audio, from at least one of an equipment connected directly to the home gateway and an equipment connected to the home gateway via a home network; and creating conversion information corresponding to the type of the mobile terminal, performing conversion for the stream or the file in accordance with the conversion information, and transmitting the converted stream or file to the mobile terminal.

According to another aspect of the present invention, there is provided a program that causes a computer, which configures a gateway apparatus installed on a network, to perform the processing of:

when a predetermined request is received from a mobile terminal, identifying a type of the mobile terminal and transmitting the request to a wireless home gateway via a femto-cell access point provided in a home;

reading a stream or a file, which includes at least one of a video and an audio, from at least one of an equipment connected directly to the home gateway or the set-top box and an equipment connected to the home gateway or the set-top box via a home network, via the wireless home gateway and the femto-cell access point;

creating conversion information corresponding to the type of the terminal; and performing conversion for the stream or the file in accordance with the conversion information and transmitting the converted stream or file to the mobile terminal.

According to the present invention, there is provided a network system comprising a terminal; a gateway; and an equipment connected directly to the gateway and/or an equipment connected indirectly to the gateway via a network wherein the gateway comprises a conversion unit that, when a predetermined request is received from the terminal via a network, identifies a type of the terminal, reads a stream or a file, which includes at least one of a video or an audio, from at least one of an equipment connected directly to the gateway and an equipment connected to the gateway via a network, creates conversion information corresponding to the type of the terminal, and performs conversion for the stream or the file, which has been read, in accordance with the conversion information and transmits the converted stream or file to the terminal.

According to another aspect of the present invention, there is provided a network system comprising a terminal; a gateway installed on a network; a home gateway installed in a home; and an equipment connected directly to the home gateway and/or an equipment connected indirectly to the home gateway via a network wherein when a predetermined request is received from the terminal via a network that is different from, or the same as, the network, the gateway apparatus installed on the network identifies a type of the mobile terminal and transmits the request to the home gateway installed in the home, reads a stream or a file, which includes at least one of a video or an audio, from at least one of an equipment connected directly to the home gateway and an equipment connected to the home gateway via a home network, and creates conversion information corresponding to the type of the mobile terminal, performs conversion for the stream or the file in accordance with the conversion information, and transmits the converted stream or file to the mobile terminal.

According to the present invention, it is possible to implement a home gateway that can decode/display in-home content on a terminal according to the ability of various types of terminals.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

The following describes modes of the present invention. The present invention provides a home gateway apparatus that can decode and display in-home content on any type of terminal, including a mobile phone and a game machine, without having to alter the terminal. When a predetermined request is received from a terminal such as a mobile phone, the home gateway according to the present invention issues a request to the home gateway installed in a home and reads content, which includes at least one of a video and an audio, from an equipment connected to the home gateway directly or via a home network. The home gateway performs conversion, suitable for at least one of capability of the terminal and characteristic of the network, for the content and transmits the converted content to the terminal.

Figure 2:
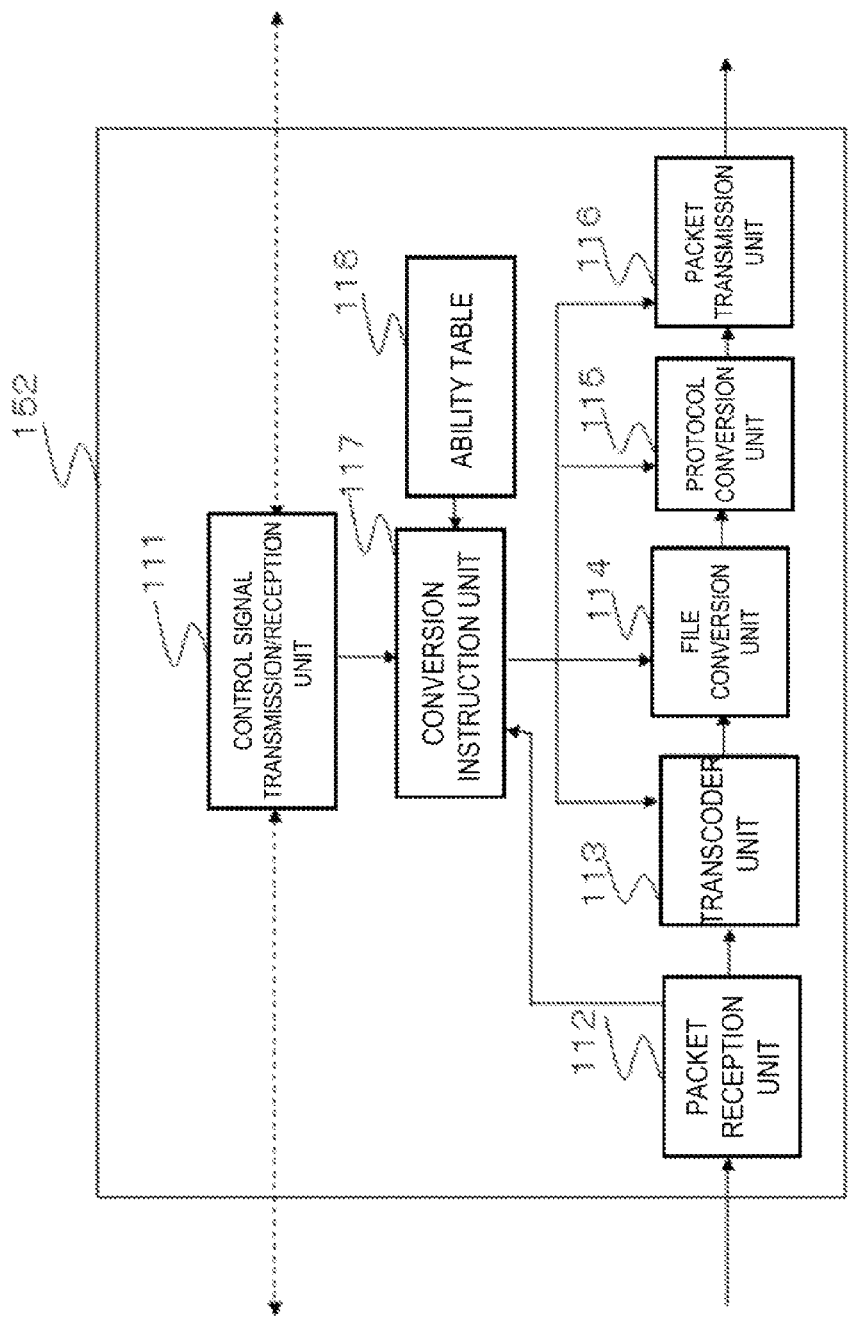
FIG. 2 is a diagram showing the configuration of a home gateway in the first exemplary embodiment of the present invention.

According to the present invention, a home gateway that is installed in a home comprises a conversion unit (including, for example, control signal transmission/reception unit 111, conversion instruction unit 117, transcoder unit 113, file conversion unit 114, and protocol conversion unit 115 in FIG. 2) that, when a predetermined request is received from a mobile terminal via a network, identifies a type of the mobile terminal, reads a stream or a file, which includes at least one of a video and an audio, from at least one of an equipment connected directly to the home gateway and an equipment connected to the home gateway via a home network, creates conversion information corresponding to the type of the mobile terminal, performs conversion for the stream or the file, which has been read, in accordance with the conversion information, and transmits the converted stream or file to the mobile terminal.

According to the present invention, when a predetermined request is received from a mobile terminal via a network and a femto-cell access point installed in a home, a home gateway installed in the home identifies a type of the mobile terminal, reads a stream or a file, which includes at least one of a video and an audio, from at least one of an equipment connected directly to the home gateway and an equipment connected to the home gateway via a home network, creates conversion information suitable for the type of the mobile terminal, performs conversion for the stream or the file, which has been read, in accordance with the conversion information, and transmits the converted stream or file to the mobile terminal.

According to the present invention, the conversion unit performs conversion for at least one of a codec, a bit rate, a screen resolution, a frame rate, a file format, and a protocol in real time.

In another mode, when a request is received from a mobile terminal such as a mobile phone, a home gateway apparatus according to the present invention issues the request to a home gateway installed in a home (in-home), reads content, which includes at least one of a video and an audio, from an equipment connected to the gateway directly or via a home network, performs conversion, suitable for at least one of the capability of the mobile terminal and the characteristic of the network, for the content, and transmits the converted content to the mobile terminal.

According to the present invention, a gateway apparatus installed on a network comprises a conversion unit (for example, control signal conversion unit 111, conversion instruction unit 117, transcoder unit 113, file conversion unit 114, and protocol conversion unit 115 in FIG. 2) that, when a request is received from a mobile terminal via a network that is different from, or the same as, the network, identifies a type of the mobile terminal, transmits the request to a home gateway installed in a home, reads a stream or a file, which includes at least one of a video and an audio, from at least one of an equipment connected directly to the home gateway and an equipment connected to the home gateway via a home network, creates conversion information corresponding to the type of the mobile terminal (at least one of the type of the mobile terminal and the characteristics of the network), performs conversion for the stream or the file in accordance with the conversion information, and transmits the converted stream or file to the mobile terminal.

According to the present invention, the conversion performed by the conversion unit of the gateway apparatus includes conversion for at least one of a codec, a bit rate, a screen resolution, a frame rate, a file format, and a protocol.

According to the present invention, the terminal includes a mobile phone, a PHS (Personal Handyphone System), a wireless LAN (Local Area Network) terminal, a WiMAX terminal, a personal computer, a game machine, a digital photo frame, and so on.

Exemplary embodiments of the present invention will be described below in detail with reference to FIG. 1 to FIG. 8. Although an example of the configuration for processing a moving image, which is one example of content, is used in the exemplary embodiments below, the same configuration may be used also for a still image, an audio, and a voice.

First Exemplary Embodiment

Figure 1:
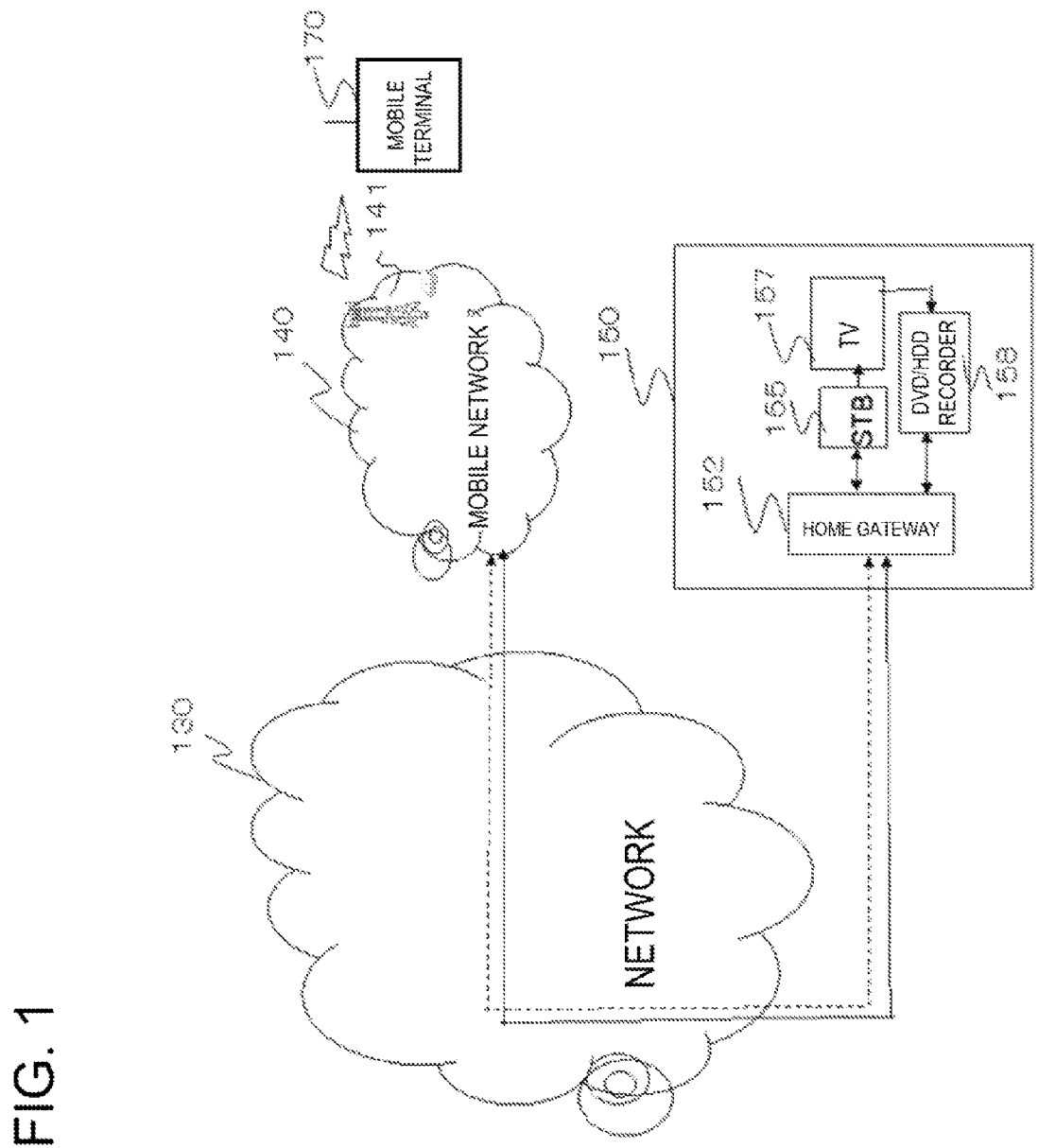
FIG. 1 is a diagram showing the system configuration of a first exemplary embodiment of the present invention.

FIG. 1 is a diagram showing the connection configuration in which a gateway apparatus in one exemplary embodiment of the present invention is used. Referring to FIG. 1, an STB (Set-Top Box) 155, a TV 157, and a DVD (Digital Versatile Disk)/HDD (Hard Disk Drive) recorder 158 are connected to a home gateway 152 in a home 150 directly or via a home network. Note that the home gateway (HGW) 152, STB 155, TV 157, and DVD/HDD recorder 158 may conform, for example, to the DLNA (Digital Living Network Alliance) guideline. The home gateway 152 has to be equipped with the function to output content, stored in the connected apparatuses, to an external network.

The home gateway 152 is connected to a network 130. The network 130 may be a BB (broadband network), an NGN (Next Generation Network), or the Internet. In the description below, a BB is assumed. As a mobile terminal 170, a mobile phone is used in the description below. The mobile terminal 170 performs radio-communicates with a radio base station 141 on a mobile network 140 and, from the mobile network 140, communicates and connects with the home gateway 152 via the (BB) network 130.

The mobile terminal 170 issues a connection request to the home gateway 152. Although HTTP (HyperText Transport Protocol) on TCP/IP (Transport Control Protocol/Internet Protocol) is used in the description below as the protocol for making a connection request, other protocols such as SIP (Session Initiation Protocol) may also be used.

When HTTP is used, a request command (HTTP request) may be used to make a connection request.

Next, the mobile terminal 170 receives a content list from the home gateway 152, selects content the user wants to view, and notifies the selected content to the home gateway 152.

Next, the following describes the home gateway 152 shown in FIG. 1. FIG. 2 is a diagram showing the configuration of the home gateway 152. Referring to FIG. 2, the home gateway 152 comprises a control signal transmission/reception unit 111, a packet reception unit 112, a transcoder unit 113, a file conversion unit 114, a protocol conversion unit 115, a packet transmission unit 116, a conversion instruction unit 117, and a capability table 118.

The control signal transmission/reception unit 111 receives an HTTP request command from the mobile terminal 170. The control signal transmission/reception unit 111 reads the terminal type information, which is stored in the user agent header (User Agent Header) of the HTTP request command, to identify the terminal type (model type) of the mobile terminal 170. For example, the terminal type information is a mobile phone manufacturer or form. The control signal transmission/reception unit 111 outputs the terminal type information to the conversion instruction unit 117.

The control signal transmission/reception unit III receives the information on the content, which will be read, from the mobile terminal 170 and instructs the DVD/HDD recorder 158 to read the content file.

The packet reception unit 112 receives the content file transmitted from the DVD/HDD recorder 158, extracts a stream stored in the file, and outputs it to the transcoder unit 113.

The packet reception unit 112 reads the content information stored in the content file (for example, video compression encoding method, video screen resolution, bit rate, frame rate, video content time length, audio compression encoding method, audio content time length, etc.) and outputs the content information to the conversion instruction unit 117.

The conversion instruction unit 117 receives the terminal type information from the control signal transmission/reception unit 111, receives the content information from the packet reception unit 112, and determines the conversion to be performed by the transcoder unit 113. For example, from the content information, the conversion instruction unit 117 recognizes that the video content that is read from the DVD/HDD recorder 158 is compression encoded with MPEG-2 MP (Main Profile) at 8 Mbps (megabits/second), that the screen resolution is SD (720×480 pixels), and that the frame rate is 30 fps (frames/second). In addition, from the terminal information, the conversion instruction unit 117 recognizes that the mobile terminal 170 is a new-type mobile phone.

The conversion instruction unit 117 stores in advance the following capability information on each terminal model type in the capability table 118, Allowable codec;
Screen resolution;
Frame rate;
Receivable file format and file size; and
Reception protocol;

and reads appropriate capability information from the capability table 118 for each terminal.

Because the terminal model type is a new terminal in this exemplary embodiment, the capability information read from the capability table 118 indicates that data is encoded with H.264 at 512 kbps with the screen resolution of QVGA (Quarter Video Graphic Array: 320×240 pixels) at a frame rate of 30 fps.

The conversion instruction unit 117 creates conversion information for performing conversion between the content information and the capability information on the terminal (for example, data is decoded with MPEG-2 MP (decoding), the screen resolution is converted from SD to QVGA, and data is encoded with H.264 at 512 kbps and at 30 fps (encoding)) and outputs the created conversion information to the transcoder unit 113 and so on. In addition, the conversion instruction unit 117 supplies the capability information, read from the capability table 118, to the file conversion unit 114, protocol conversion unit 115, and packet transmission unit 116.

The transcoder unit 113 receives an extracted stream from the packet reception unit 112, receives the conversion information described above (for example, data is decoded with MPEG-2 MP, the screen resolution is converted from SD to QVGA, and data is encoded with H.264 at 512 kbps and at 30 fps) from the conversion instruction unit 117, causes the transcoder, which operates in real time, to operate to convert the stream according to this conversion information (for example, the received stream is decoded with MPEG-2 MP, the screen resolution is converted from SD to QVGA, and the stream is encoded with H.264 at 512 kbps and at 30 fps), and outputs the converted stream to the file conversion unit 114.

The file conversion unit 114 receives the capability information on the mobile terminal 170 from the conversion instruction unit 117, receives the converted stream from the transcoder unit 113, and converts the stream to a file format suitable for transmission to the mobile terminal 170 according to the capability information. The file format is, for example, 3GPP, 3GPP2, MP4, etc., with the allowable file format dependent on the model type of the mobile terminal.

Therefore, the file conversion unit 114 determines which file format to use in accordance with the capability information on the terminal, generates a file in accordance with the determined file format, stores the converted stream in the file, and supplies the file to the protocol conversion unit 115. For the details of the 3GPPP file format, see the 3GPP TS26.244 standard.

The protocol conversion unit 115 receives the capability information from the conversion instruction unit 117, determines the protocol via which the mobile terminal 170 will be able to receive the file, receives the file from the file conversion unit 114, and transmits the file using this protocol. The protocol is, for example, HTTP/TCP. In the description below, assuming that the HTTP/TCP protocol is used, the protocol conversion unit 115 read the file and outputs the file using the HTTP/TCP/IP protocol to the packet transmission unit 116.

The packet transmission unit 116 receives the capability information from the conversion instruction unit 117, receives the reception IP address of the mobile terminal 170, receives the protocol and the file format from the protocol conversion unit 115, and transmits TCP/IP packets to the mobile terminal 170.

Returning to FIG. 1, TCP/IP packets are transmitted from the home gateway 152 to the mobile terminal 170, connected to the mobile network 140, via the network 130.

The mobile terminal 170 receives the content file from the mobile network 140 in the form of TCP/IP packets, retrieves the stream from the content file, and decodes, reproduces, and displays the content.

Note that the exemplary embodiment described above is exemplary only. In another exemplary embodiment, not only a broadband network but also an NGN (Next Generation Network) network or the Internet may be used as the network 130.

If the mobile terminal 170 can also receive an RTP (Real-time Transport Protocol) stream, the gateway apparatus in FIG. 2 may be configured as follows. That is, the transcoder unit 113 outputs the stream directly to the protocol conversion unit 115 by bypassing the file conversion unit 114, the protocol conversion unit 115 converts the protocol to the RTP/UDP (User Datagram Protocol) protocol, and the packet transmission unit 116 transmits the RTP/UDP/IP stream to the mobile terminal 170.

As the mobile network 140, a WiMax (Worldwide Interoperability for Microwave Access) network or an LTE (Log Term Evolution) network may be used in the same configuration. A network in which a femto-cell access point is used may also be used.

The DVD/HDD recorder 158 may use a known codec other than MPEG-2, for example, H.264, MPEG-4, and WMV (Windows (registered trademark) Media Video), as the codec for compression encoding video content. In this case, the transcoder unit 113 may use a codec other than MPEG-2, for example, H.264, MPEG-4, and WMV, to decode a stream received from the home gateway 152.

When a stream read from the DVD/HDD recorder 158 is encrypted, the home gateway 152 may be configured in such a way that the packet reception unit 112 retrieves the stream and, when the stream is output to the transcoder unit 113, the transcoder unit 113 decrypts the stream before it is converted. In this case, the home gateway 152 may also be configured to receive the information on encryption/decryption, to notify the received information to the conversion instruction unit 117, and to notify the information to the transcoder unit 113 via the conversion instruction unit 117.

Although the exemplary embodiment described above provides the configuration for content generated by compression encoding a moving image signal, the same configuration may also be used for a still image or an audio signal.

In the exemplary embodiment described above, the processing and the function of the control signal transmission/reception unit 111, packet reception unit 112, transcoder unit 113, file conversion unit 114, protocol conversion unit 115, packet transmission unit 116, and conversion instruction unit 117 may of course be implemented in the home gateway 152, shown in FIG. 2, by the program running in a computer that configures the home gateway 152. This is also true in other exemplary embodiments that will be described later.

Second Exemplary Embodiment

Figure 3:
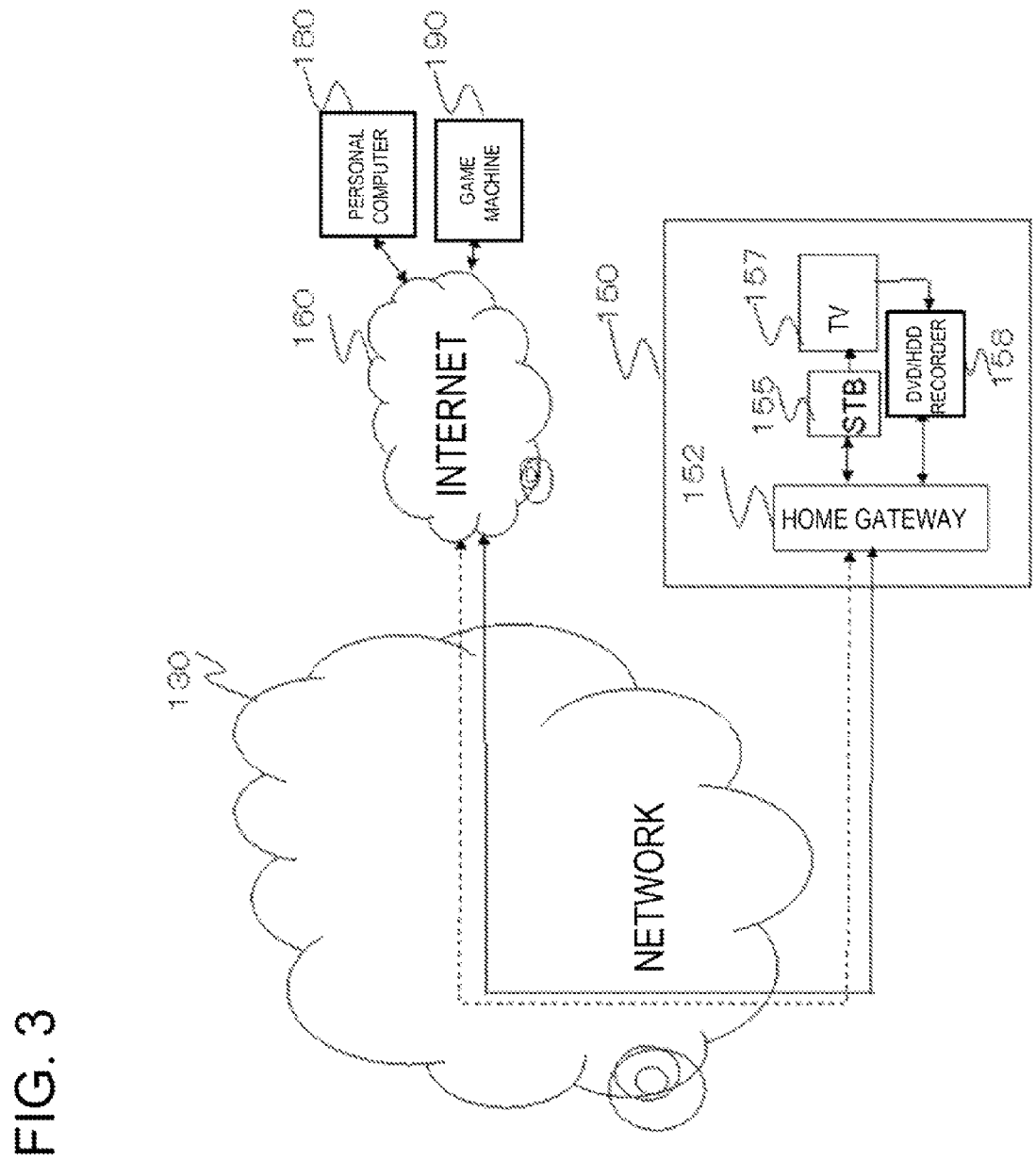
FIG. 3 is a diagram showing the system configuration of a second exemplary embodiment of the present invention.

FIG. 3 is a block diagram showing a second exemplary embodiment of the present invention. In FIG. 3, the components with the reference numerals already used in FIG. 1 and FIG. 2 perform the operations corresponding to those in FIG. 1 and FIG. 2 and therefore the description is omitted. FIG. 3 shows the connection configuration in which a terminal other than a mobile phone, such as a personal computer 180 and a game machine 190, is connected as a mobile terminal.

The personal computer 180 or the game machine 190 transmits the connection request signal to the home gateway 152 via the Internet 160 using a terminal-specific protocol (for example, HTTP). Because the subsequent transfer of information to and from the home gateway 152 is similar to that described in FIG. 1, the description is omitted here.

A digital photo frame may also be used instead of the game machine 190. A local network or a wireless LAN network may also be used instead of the Internet 160.

Third Exemplary Embodiment

Figure 4:
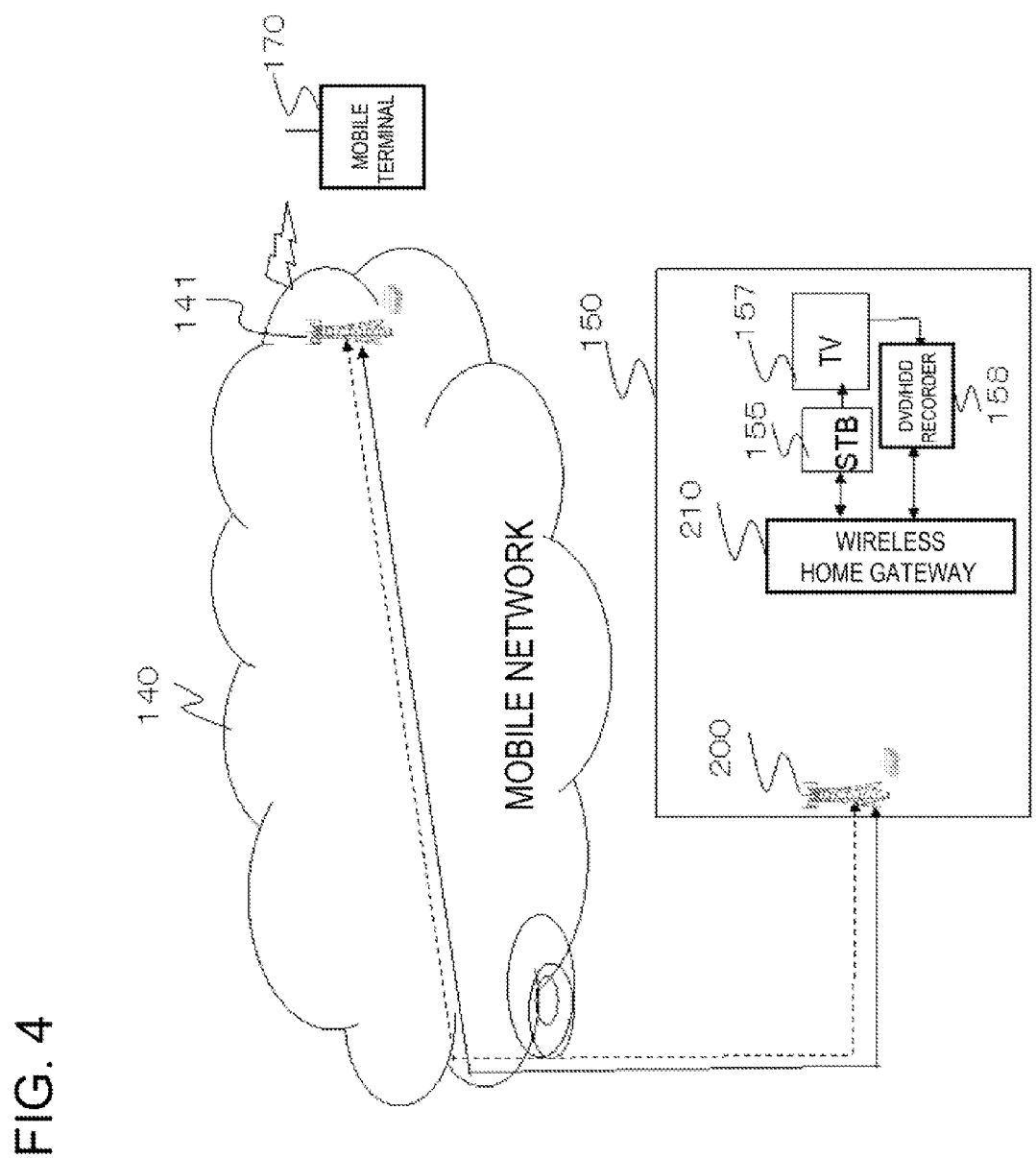
FIG. 4 is a diagram showing the system configuration of a third exemplary embodiment of the present invention.

FIG. 4 is a diagram showing the configuration of a third exemplary embodiment of the present invention. In FIG. 4, the components with reference numerals already used in FIG. 1 perform the operations similar to those described in FIG. 1 and therefore the description is omitted. In FIG. 4, the mobile terminal 170 indicates a mobile phone. The mobile terminal 170 accesses a femto-cell access point 200, installed in a home, via the mobile network 140 and wirelessly communicates with a wireless home gateway 210 via the femto-cell access point 200.

The wireless home gateway 210 wirelessly transmits and receives a signal to and from the femto-cell access point 200. The wireless home gateway 210 is a gateway similar to the home gateway 152 shown in FIG. 2 except that the radio function is added. Except the radio function, the home gateway 152 has the same configuration as the home gateway in FIG. 2. As the radio functions that are implemented on the wireless home gateway 210, the following may be used for examples:

HSDPA (High Speed Downlink Packet Access),
HSPA (High Speed Packet Access), or
LTE (Long Term Evolution).

As the femto-cell access point 200, the following may be used.

HNB (Home Node B), or
HeNB (Home eNodeB)

Note that the configuration shown in FIG. 3 and FIG. 4 is the configuration of an exemplary embodiment only. In another exemplary embodiment, the network 130 shown in FIG. 3 may be not only a broadband network but also an NGN (Next Generation Network) network or the Internet.

If the mobile terminal 170 is capable of receiving data in the form of a file as well as an RTP stream, the home gateway shown in FIG. 2 may be configured to bypass the file conversion unit 114, to convert the protocol to the RTP/UDP protocol by the protocol conversion unit 115, and to transmit an RTP/UDP/IP stream from the packet transmission unit 116 to the mobile terminal 170.

In FIG. 4, a WiMax network or an LTE network may be used in the same configuration as the mobile network 140 in FIG. 4.

As the codec used by the DVD/HDD recorder 158 for performing compression encoding of video content, a known codec other than MPEG-2, such as H.264, MPEG-4, or WMV (Windows (registered trademark) Media Video), may be used. In this case, the transcoder unit 113 may use a known codec other than MPEG-2, such as H.264, MPEG-4, or WMV, to decode a stream received from the home gateway 152.

If a stream read from the DVD/HDD recorder 158 is encrypted, the home gateway. 152 or the wireless home gateway 210 may be configured in such a way that the packet reception unit 112 retrieves a stream and, when the stream is output to the transcoder unit 113, the transcoder unit 113 decrypts and then converts the stream. In this case, the home gateway 152 may also be configured to obtain the information on the encryption/decryption, to notify the information to the conversion instruction unit 117, and then to notify the information to the transcoder unit 113 via the conversion instruction unit 117.

The home gateway according to the present invention allows a terminal to convert content, which is in a home and includes video, in real time according to the ability of the terminal or the characteristics of a network even if the ability to decode video or audio content differs among the types of terminals such as a mobile phone, a mobile terminal, and a game machine. According to the present invention, home video content can be decoded and displayed on various types of terminal without having to alter the terminal.

It is of course possible to implement the function of the home gateway apparatus in the exemplary embodiments described above on a gateway apparatus that is installed on the network 130 and performs interconnection between the mobile network 140 and the network 130. The following describes this implementation as fourth to sixth exemplary embodiments.

Fourth Exemplary Embodiment

Figure 5:
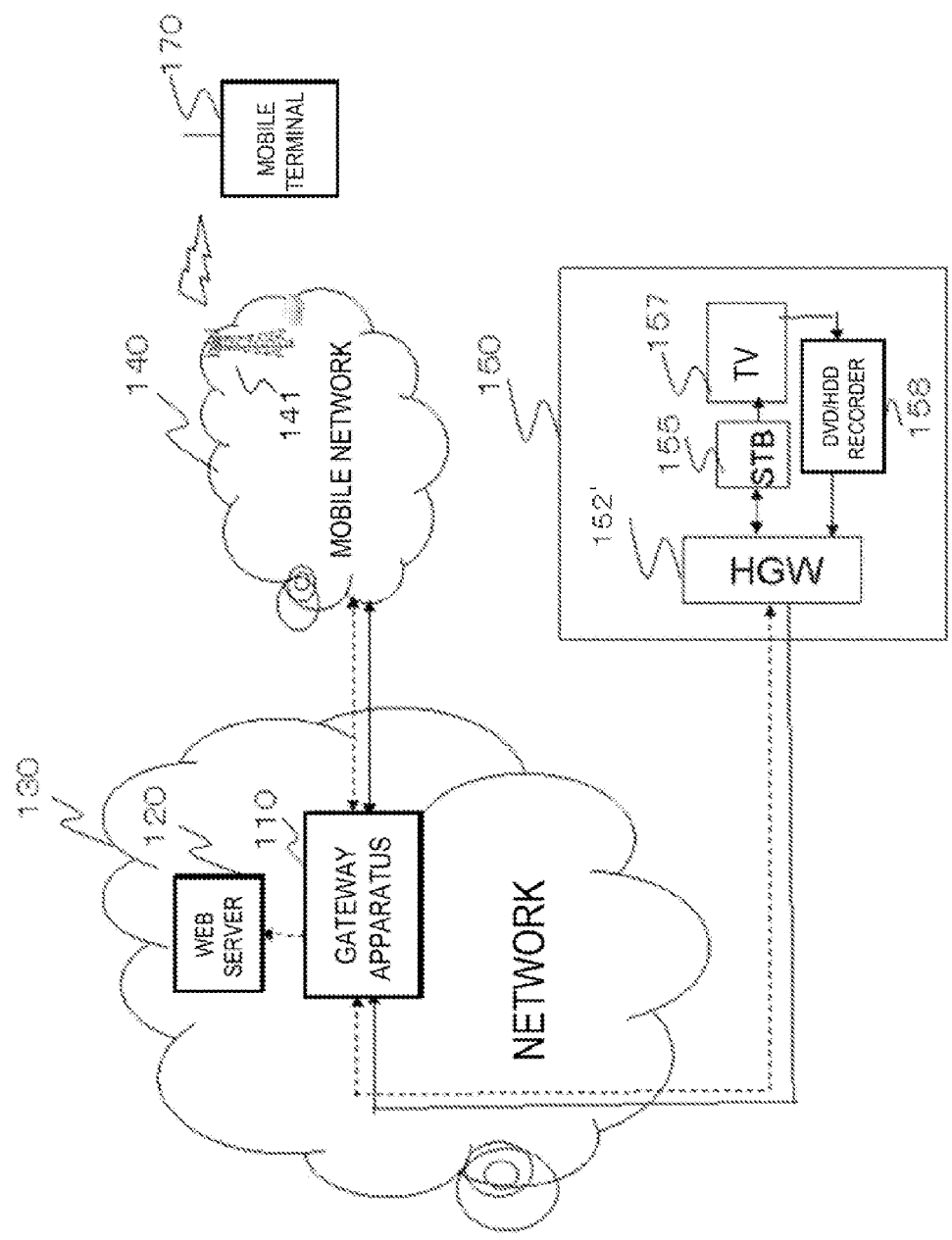
FIG. 5 is a diagram showing the system configuration of a fourth exemplary embodiment of the present invention.

FIG. 5 is a diagram showing the connection configuration in which a gateway apparatus in a fourth exemplary embodiment of the present invention is used. In FIG. 5, a STB (Set Top Box) 155, a TV 157, and a DVD (Digital Versatile Disk)/HDD (Hard Disk Drive) recorder 158 are connected, directly or via a home network, to a home gateway (HGW) 152' in a home. Note that the products 152', 155, 157, and 158 may conform, for example, to the DLNA (Digital Living Network Alliance) guideline. The HGW 152' is required to have the function to output content, stored in a connected apparatus, to the external network. Instead of the HGW 152', a broadband router or a home server may also be used.

The HGW 152' is connected to the network 130. The network 130 may be a BB (Broadband network), NGN (Next Generation Network), or the Internet. A BB is assumed in the description below.

A gateway apparatus 110, which is installed on the same network 130 as the HGW 152', periodically performs a health check communication and the like with the HGW 152', exchanges the IP addresses with the HGW 152', and reserves a communication path.

In the description below, the mobile terminal 170 is a mobile phone. Before making a connection, the mobile terminal 170 accesses a web server 120 via the mobile network 140 and the network 130 for authentication. After the authentication, the selection screen is displayed to prompt the user to select content the user wants to view.

The web server 120 outputs the authentication completion notification and the content selection result to the gateway apparatus 110 and, at the same time, notifies the mobile terminal 170 about the reception IP address of the gateway apparatus 110.

The mobile terminal 170 issues a connection request to the gateway apparatus 110. Although HTTP (HyperText Transport Protocol) on TCP/IP (Transport Control Protocol/Internet Protocol) is used in the description below as the protocol for making a connection request, other protocols such as SIP (Session Initiation Protocol) may also be used. When HTTP is used, a request command (HTTP request) may be used to make a connection request.

Figure 6:
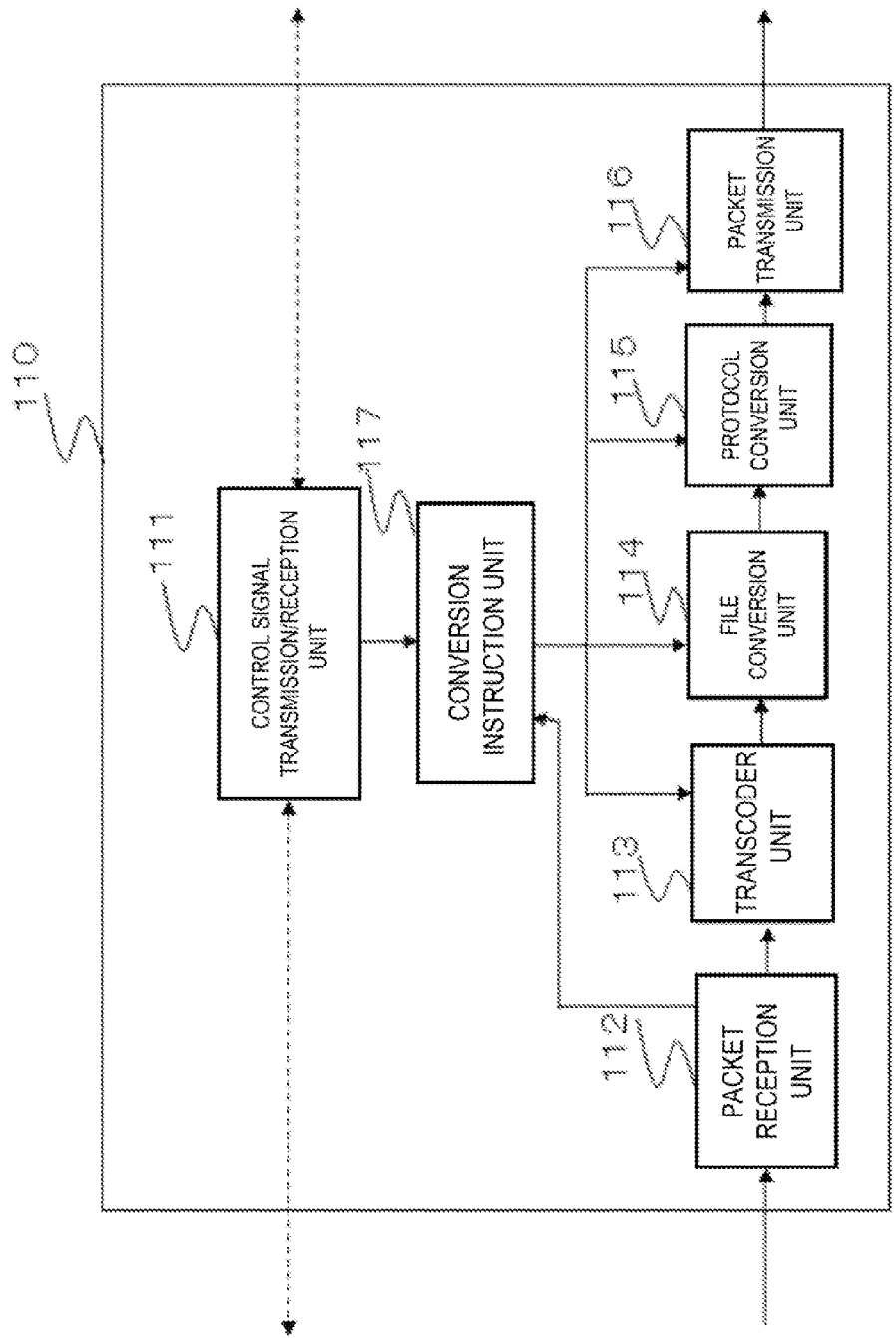
FIG. 6 is a diagram showing the configuration of a gateway in the fourth exemplary embodiment of the present invention.

FIG. 6 is a diagram showing the configuration of the gateway apparatus 110. The configuration shown in FIG. 6 is basically the same as that shown in FIG. 2. Referring to FIG. 6, the gateway apparatus 110 comprises a control signal conversion unit 111, a packet reception unit 112, a transcoder unit 113, a file conversion unit 114, a protocol conversion unit 115, a packet transmission unit 116, and a conversion instruction unit 117.

The control signal conversion unit 111 receives an authentication completion notification and a content selection result from the web server 120, and receives an HTTP request command from the mobile terminal 170.

The control signal conversion unit III reads the terminal type information, stored in the user agent (User-Agent) header of the HTTP request command (type of the web browser that issues this HTTP request command), to identify the terminal type of the mobile terminal 170. For example, the terminal type information is a mobile phone manufacturer or form.

The control signal conversion unit III outputs the terminal type information to the conversion instruction unit 117.

On the other hand, the control signal conversion unit 111 regularly receives the health check signal from the HGW 152' to receive the notification about the reception IP address of the HGW 152'.

The control signal conversion unit 111 converts the HTTP request command, received from the mobile terminal 170, to a SIP (Session Initiation Protocol) Invite message (session establishment message) and transmits the resulting message to the reception IP address of the HGW 152'. In addition, the control signal conversion unit 111 converts the content selection result to a SIP Info message (transmission of session control information) and transmits the resulting message to the HGW 152'.

Returning to FIG. 5, the HGW 152' receives the SIP Invite message from the gateway apparatus 110 and opens a session.

In addition, the HGW 152' receives the SIP Info message from the gateway apparatus 110, analyzes this message, identifies the video content to be read, and notifies the content to the DVD/HDD recorder 158. In addition, the HGW 152' reads the corresponding content file from the DVD/HDD recorder 158 and transmits the content file to the gateway apparatus 110 over the network 130 using the UPnP (Universal Plug and Play) protocol on TCP/IP.

Referring again to FIG. 6, the packet reception unit 112 of the gateway apparatus 110 receives the packets of the content file from the HGW 152', extracts the stream stored in the file, and outputs the extracted stream to the transcoder unit 113.

In addition, the packet reception unit 112 reads the content information (for example, video compression encoding method, video screen resolution, bit rate, frame rate, video content time length, audio compression encoding method, audio content time length) stored in the content file and outputs the content information to the conversion instruction unit 117.

The conversion instruction unit 117 receives the terminal type information from the control signal conversion unit 111, and receives the content information from the packet reception unit 112, to determine what conversion the transcoder unit 113 is to perform. For example, the content information indicates that the video content received from the HGW 152' is compression encoded with MPEG-2 MP (Moving Picture Experts Group Phase 2 Main Profile) at 10 Mbps (Megabits/second), that the screen resolution is SD (Standard Definition: 720×480 pixels), and that the frame rate is 30 fps (frames/second).

Because the terminal type information indicates that the mobile terminal 170 is a new-type mobile phone, the mobile terminal can encode with H.264 at 784 kbps with the screen resolution of QVGA (Quarter Video Graphic Array: 320×240 pixels). Therefore, the conversion instruction unit 117 creates the conversion information for conversion between the two (for example, data is decoded with MPEG-2 MP, the screen resolution is converted from SD to QVGA, and data is encoded with H.264 at 512 kbps (kilobits/second)) and outputs the created conversion information to the transcoder unit 113.

The transcoder unit 113 receives an extracted stream from the packet reception unit 112, receives the conversion information described above (for example, data is decoded with MPEG-2 MP, the screen resolution is converted from SD to QVGA, and data is encoded with H.264 at 512 kbps) from the conversion instruction unit 117, causes the transcoder, which operates in real time, to operate to convert the stream according to this conversion information (for example, the received stream is decoded with MPEG-2 MP, the screen resolution is converted from SD to QVGA, and the stream is encoded with H.264 at 512 kbps), and outputs the converted stream to the file conversion unit 114.

The file conversion unit 114 receives the model type information on the mobile terminal 170 from the conversion instruction unit 117, receives the converted stream from the transcoder unit 113, and converts the stream to a file format suitable for transmission to the mobile terminal 170 according to the model type information. The file format is, for example, 3GP, 3GP2, MP4, etc. Because the allowable file format is dependent on the model type of the mobile terminal, the file conversion unit 114 determines which file format to use according to the model type information on the mobile terminal 170 received from the conversion instruction unit 117, stores the converted stream in the file using the determined file format, and outputs the file to the protocol conversion unit 115. For the details of the 3GP file format, see the 3GPP TS26.244 standard.

The protocol conversion unit 115 receives the model type information on the mobile terminal 170 from the conversion instruction unit 117, receives the file from the file conversion unit 114, determines the protocol via which the mobile terminal 170 will be able to receive the file, and transmits the file using this protocol. The protocol is, for example, HTTP. In the description below, assuming that the HTTP protocol is used, the protocol conversion unit 115 reads the file and the output the file using the HTTP/TCP/IP protocol to the packet transmission unit 116.

The packet transmission unit 116 receives the model type information from the conversion instruction unit 117, receives the reception IP address of the mobile terminal 170, receives the protocol and the file format from the protocol conversion unit 115, and transmits TCP/IP packets.

Returning to FIG. 5, the TCP/IP packets are transmitted from the gateway apparatus 110 to the mobile terminal 170 on the mobile network 140 via the network 130.

The mobile terminal 170 receives the content file from the mobile network 140 in the form of TCP/IP packets, retrieves the stream from the content file, and decodes, reproduces, and displays the content. This completes the description of the exemplary embodiment. Note that the exemplary embodiment described above is exemplary only. In another exemplary embodiment, not only a broadband network but also an NGN (Next Generation Network) network or the Internet may be used as the network 130.

If the HGW 152' can receive an HTTP request via the network 130, the control signal conversion unit 111 may transmit the HTTP request directly to the HGW 152'.

If the mobile terminal 170 can also receive an RTP (Real-Time Transport Protocol) stream, the gateway apparatus may be configured as follows. That is, the transcoder unit 113 outputs the stream directly to the protocol conversion unit 115 by bypassing the file conversion unit 114, the protocol conversion unit 115 converts the protocol to the RTP/UDP (User Datagram Protocol) protocol, and the packet transmission unit 116 transmits the RTP/UDP/IP stream to the mobile terminal 170.

As the mobile network 140, a WiMax (Worldwide Interoperability for Microwave Access) network or an LTE (Log Term Evolution) network may be used in the same configuration. A network in which a femto-cell access point is used may also be used.

As the mobile network 140, a mobile circuit switching network may be used. In this case, the configuration of the control signal conversion unit 111 and the packet transmission unit 116 of the gateway apparatus 110 must be changed. The control signal conversion unit 111 is changed so that the call control signal (for example, ISUP (ISDN User Part) etc.) of the mobile circuit switching can be received.

The packet transmission unit 116 is not necessary and is replaced by an H.223 transmission unit. The H.223 transmission unit may be configured to support the mobile circuit switching TV phone protocol such as 3G-324M.

The DVD/HDD recorder 158 may use a known codec other than MPEG-2, for example, H.264, MPEG-4, and WMV (Windows (registered trademark) Multimedia Video), as the codec for compression encoding video content. In this case, the transcoder unit 113 may use a codec other than MPEG-2, for example, H.264, MPEG-4, and WMV, to decode a stream received from the HGW 152'.

When a stream read from the DVD/HDD recorder 158 via the HGW 152' is encrypted, the gateway apparatus 110 may be configured so that the packet reception unit 112 decrypts the stream when the stream is retrieved and then outputs the decrypted stream to the transcoder unit 113. In this case, the gateway apparatus 110 and the control signal conversion unit 111 may be configured to obtain the encryption/decryption information from the HGW 152' or the server of the service operator and to notify this information to the conversion instruction unit 117 and then to the packet reception unit 112.

Although the exemplary embodiment described above provides the configuration for content generated by compression encoding a moving image signal, the same configuration may also be used for a still image or an audio signal.

The processing and the function of the components of the gateway apparatus 110 in FIG. 6 may of course be implemented by the programs running in a computer that configures the gateway apparatus.

Fifth Exemplary Embodiment

Figure 7:
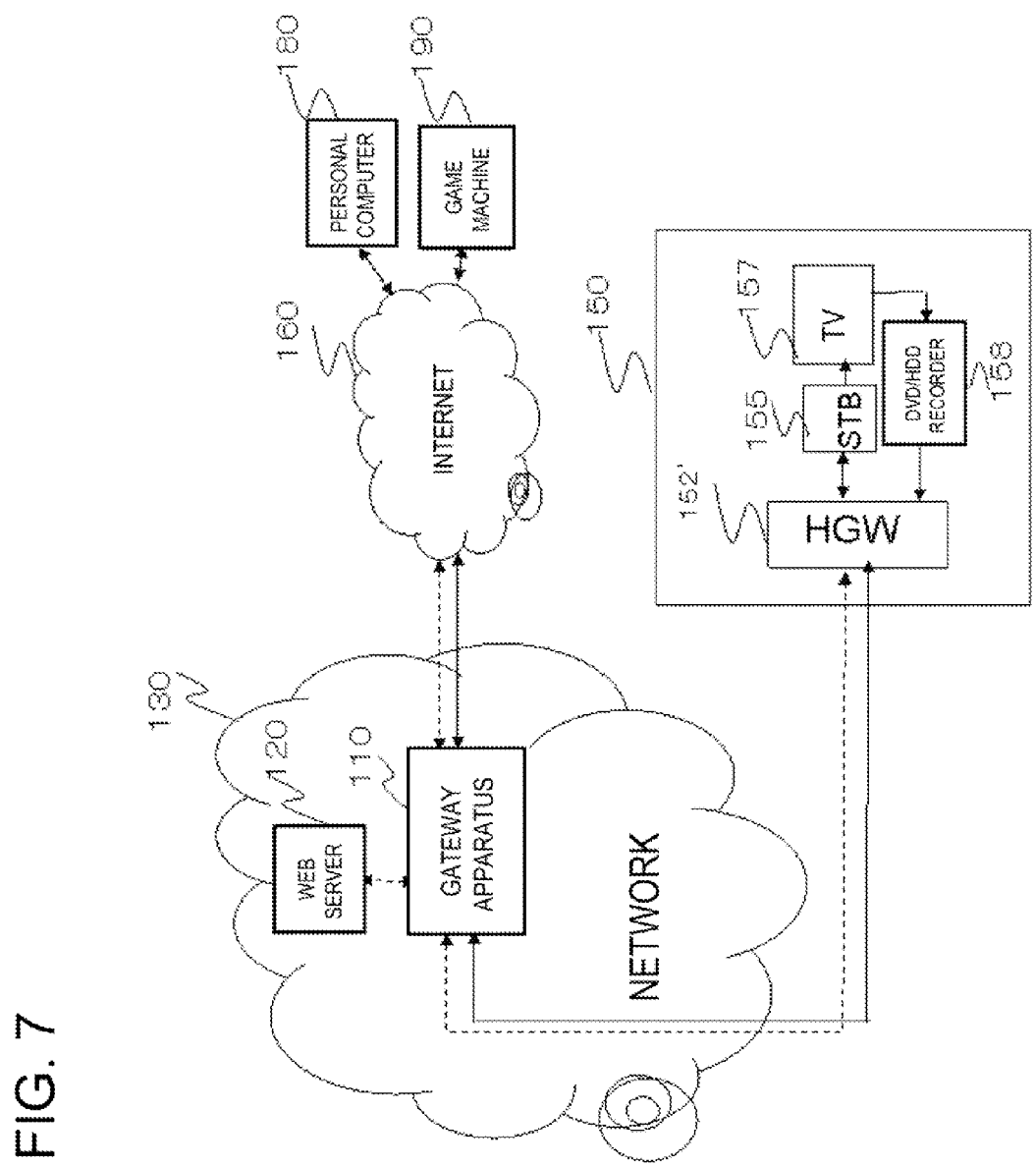
FIG. 7 is a diagram showing the system configuration of a fifth exemplary embodiment of the present invention.

FIG. 7 is a diagram showing a fifth exemplary embodiment of the present invention. In FIG. 7, the components with the reference numerals already used in FIG. 5 perform the operations corresponding to those in FIG. 5 and therefore the description is omitted.

FIG. 7 is a diagram showing the connection configuration in which a mobile terminal other than a mobile phone, for example, a personal computer 180 or a game machine 190, is connected. The personal computer 180 or the game machine 190 transmits a connection request signal to the gateway apparatus 110 via the Internet 160 using a terminal-specific protocol (for example, HTTP). Because the subsequent transfer of information to and from the gateway apparatus 110 is similar to that described in FIG. 5, the description is omitted here. A digital photo frame may also be used instead of the game machine 190. A local network or a wireless LAN network may also be used instead of the Internet 160.

Sixth Exemplary Embodiment

Figure 8:
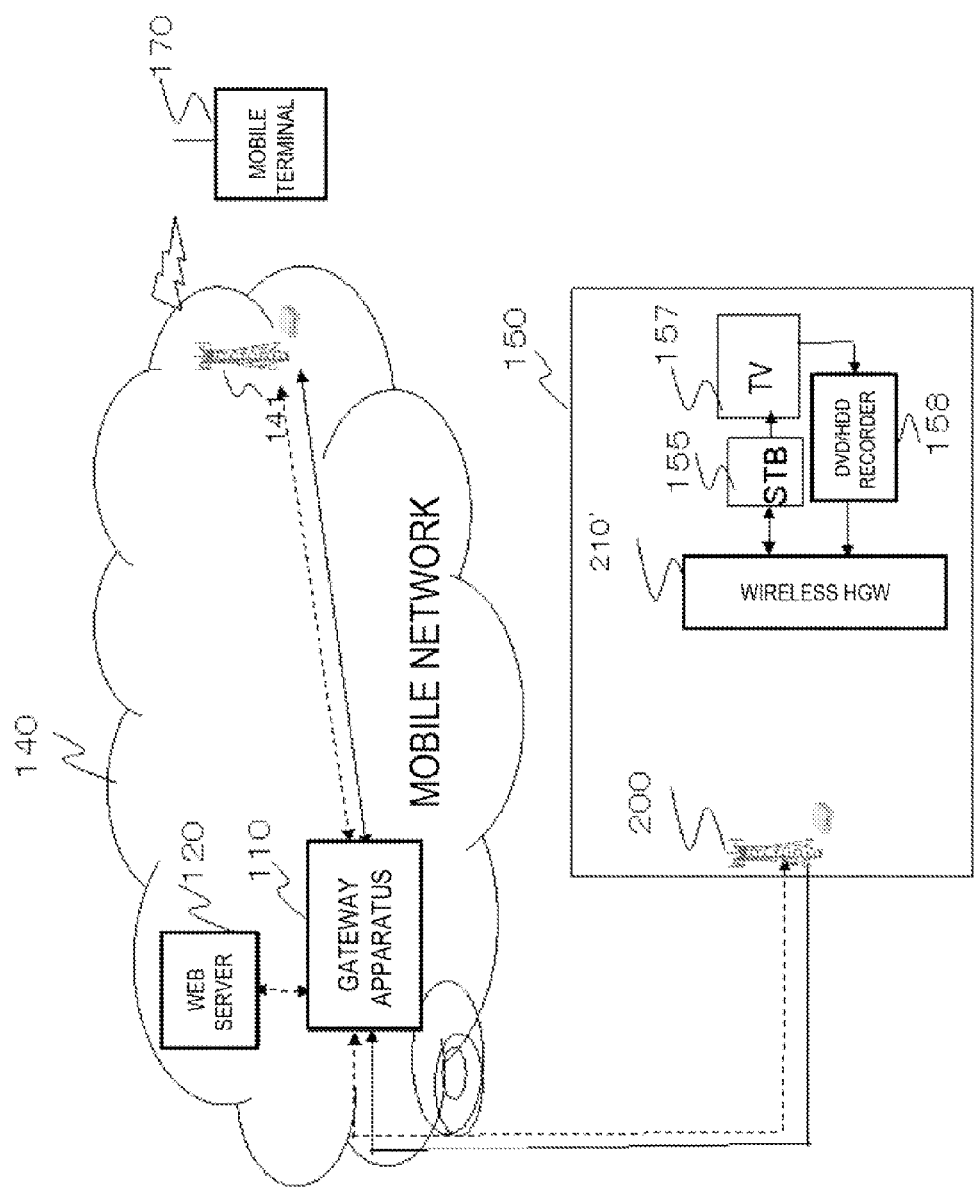
FIG. 8 is a diagram showing the system configuration of a sixth exemplary embodiment of the present invention.

FIG. 8 is a diagram showing the configuration of a sixth exemplary embodiment of the present invention. In FIG. 8, the components with the reference numerals already used in FIG. 5 perform the operations corresponding to those in FIG. 5 and therefore the description is omitted.

In the example shown in FIG. 8, the mobile terminal 170 comprises a mobile phone wirelessly connected to the radio base station 141. In this exemplary embodiment, the gateway apparatus 110 is on the mobile network 140. The gateway apparatus 110 is configured to communicate with the HGW 210' via the femto-cell access point 200. The wireless HGW 210' wirelessly communicates with the femto-cell access point 200.

As the radio functions, HSDPA (High Speed Downlink Packet Access), HSPA (High Speed Packet Access), or LTE (Long Term Evolution) may be used. As the femto-cell access point, HNB (Home Node B) or HeNB (Home eNodeB) may be used.

Note that the configuration shown in FIG. 7 and FIG. 8 is the configuration of an exemplary embodiment only. In another exemplary embodiment, the network 130 shown in FIG. 7 may be not only a broadband network but also an NGN (Next Generation Network) network or the Internet.

If the HGW 152' (210') can receive an HTTP request via the network 130, the control signal conversion unit 111 in FIG. 7 and FIG. 8 may transmit the HTTP request directly to the HGW 152' (210').

If the mobile terminal 170 is capable of receiving data in the form of a file as well as an RTP stream, the gateway apparatus may be configured to bypass the file conversion unit 114, to convert the protocol to the RTP/UDP protocol by the protocol conversion unit 115, and to transmit an RTP/UDP/IP stream from the packet transmission unit 116 to the mobile terminal 170.

In FIG. 8, a WiMax network or an LTE network may be used as the mobile network 140 in the same configuration. As the mobile network 140, a mobile circuit switching network may also be used.

In this case, the configuration of the control signal conversion unit 111 and the packet transmission unit 116 of the gateway apparatus 110 must be changed. The control signal conversion unit 111 is changed so that the call control signal (for example, ISUP etc.) of the mobile circuit switching can be received. The packet transmission unit 116 is not necessary and is replaced by an H.223 transmission unit. The H.223 transmission unit may be configured to support the mobile circuit switching TV phone protocol such as 3G324M.

In FIG. 7 and FIG. 8, the DVD/HDD recorder 158 may use a known codec other than MPEG-2, for example, H.264, MPEG-4, and WMV, as the codec for compression encoding video content. In this case, the transcoder unit 113 may use a codec other than MPEG-2, for example, H.264, MPEG-4, and WMV, to decode a stream received from the HGW 152' (210').

In FIG. 7 and FIG. 8, when a stream read from the DVD/HDD recorder 158 via the HGW 152' (210') is encrypted, the gateway apparatus 110 may be configured in such a way that, when the stream is retrieved, the packet reception unit 112 decrypts the stream and then outputs the stream to the transcoder unit 113. In this case, the gateway apparatus 110 and the control signal conversion unit 111 may also be configured to receive the information on encryption/decryption from the HGW 152' (210') or the server of the service operator and to notify the received information to the conversion instruction unit 117 and then to the packet reception unit 112.

The present invention achieves the effect of eliminating the need to perform the setting of a home gateway even when a content owner himself or herself views in-home content, which includes a video, or allows another particular user to share the in-home content, via a broadband network, NGN, Internet, or mobile network.

The present invention provides another effect that in-home video content can be decoded and displayed on various types of terminal without having to alter the terminal even if the ability to decode video or audio content differs among the types of terminals such as a mobile phone, a mobile terminal, and a game machine.

The disclosure of Patent Documents given above is hereby incorporated by reference into this specification. The exemplary embodiments may be changed and adjusted in the scope of the entire disclosure (including claims) of the present invention and based on the basic technological concept. In the scope of the claims of the present invention, various disclosed elements may be combined and selected in a variety of ways. That is, it is to be understood that the present invention includes modifications and changes that may be made by those skilled in the art according to the entire disclosure, including the claims, and the technological concept.

The whole or part of the exemplary embodiments disclosed above can be described as, but not limited to, the following supplementary notes.

(Supplementary Note 1)
A home gateway apparatus that is installed in a home, the gateway apparatus comprising:
a conversion unit that,
when a predetermined request is received from a terminal via a network,
identifies a type of the terminal,
reads a stream or a file, which includes at least one of a video and an audio, from at least one of an equipment connected directly to the gateway and an equipment connected to the gateway via a home network, creates conversion information corresponding to the type of the terminal, performs conversion for the stream or the file, which has been read, in accordance with the conversion information, and transmits the converted stream or file to the terminal.

(Supplementary Note 2)
A home gateway apparatus that is installed in a home, the gateway apparatus comprising:
a conversion unit that,
when a predetermined request is received from a terminal via a network and a femto-cell access point installed in the home,
identifies a type of the terminal,
reads a stream or a file, which includes at least one of a video and an audio, from at least one of an equipment connected directly to the home gateway and an equipment connected to the home gateway via a home network, creates conversion information corresponding to the type of the terminal, performs conversion for the stream or the file, which has been read, in accordance with the conversion information, and transmits the converted stream or file to the terminal.

(Supplementary Note 3)
The home gateway apparatus as described in supplementary note 1 or 2 wherein
for each model type of a terminal, the conversion unit holds capability information on the terminal including at least one of
an allowable codec,
a frame rate,
a screen resolution,
a file format and a file size receivable by the terminal, and
a reception protocol of the terminal and
reads the capability information corresponding to the model type of the terminal and creates conversion information corresponding to the capability information.

(Supplementary Note 4)
The home gateway apparatus as described in one of supplementary notes 1-3 wherein
as the conversion, the conversion unit performs conversion for at least one of
a codec,
a bit rate, a screen resolution,
a frame rate,
a file format and a file size, and
a protocol
in real time.

(Supplementary Note 5)
The home gateway apparatus as described in one of supplementary notes 1-4 wherein
the terminal includes at least one of a mobile phone, a PHS (Personal Handyphone System), a wireless LAN (Local Area Network) terminal, a WiMAX (Worldwide Interoperability for Microwave Access) terminal, a personal computer, a game machine, and a digital photo frame.

(Supplementary Note 6)
The home gateway apparatus as described in supplementary note 1 comprising:
a control signal conversion unit that, when a request command is received from a terminal, reads terminal type information from the request command, receives from the terminal the information on content to be read, and instructs the apparatus to read the content;
a packet reception unit that receives packets that include content information acquired from the apparatus;
a capability table that holds capability information, including at least one of an allowable codec, a screen resolution, a frame rate, a receivable file format and a file size, and a reception protocol, corresponding to the type of the terminal;
a conversion instruction unit that receives the terminal type information from the control signal conversion unit, acquires the capability information corresponding to the terminal type information from the capability table, receives the content information from the packet reception unit, creates conversion information on the content information corresponding to the capability information and outputs the created information to the transcoder unit, and outputs the capability information, read from the capability information table, to the file conversion unit, protocol conversion unit, and packet transmission unit;
a transcoder unit that receives an extracted stream from the packet reception unit and performs the transcode processing corresponding to the conversion information received from the conversion instruction unit;
a file conversion unit that receives the capability information on the terminal from the conversion instruction unit, receives the converted stream from the transcoder unit, and converts the stream to a file format for transmission to the terminal according to the capability information on the terminal;
a protocol conversion unit that receives the capability information on the terminal from the conversion instruction unit, receives the file from the file conversion unit, determines the protocol corresponding to the capability information on the terminal, and transmits the file using the protocol; and
a packet transmission unit that receives the capability information on the terminal from the conversion instruction unit, receives the protocol and the file format from the protocol conversion unit, and transmits the packets to the terminal.

(Supplementary Note 7)
A home gateway method comprising the steps, by a home gateway installed in a home, of
when a predetermined request is received from a terminal via a network,
identifying a type of the terminal;
reading a stream or a file, which includes at least one of a video or an audio, from at least one of an equipment connected directly to the gateway and an equipment connected to the gateway via a home network;
creating conversion information corresponding to the type of the terminal; and
performing conversion for the stream or the file, which has been read, in accordance with the conversion information and transmitting the converted stream or file to the terminal.

(Supplementary Note 8)
A home gateway method comprising the steps, by a home gateway installed in a home, of
when a predetermined request is received from a terminal via a network and a femto-cell access point installed in the home,
identifying a type of the terminal;
reading a stream or a file, which includes at least one of a video or an audio, from at least one of an equipment connected directly to the home gateway and an equipment connected to the home gateway via a home network;
creating conversion information corresponding to the type of the terminal; and
performing conversion for the stream or the file, which has been read, in accordance with the conversion information and transmitting the converted stream or file to the terminal.

(Supplementary Note 9)
The home gateway method as described in supplementary note 7 or 8, further comprising the steps, by the home gateway, of:
for each model type of a terminal, holding capability information on the terminal including at least one of
an allowable codec,
a screen resolution,
a frame rate,
a file format and a file size receivable by the terminal, and
a reception protocol of the terminal; and
reading the capability information on the terminal corresponding to the model type of the terminal and creating conversion information corresponding to the capability information.

(Supplementary Note 10)
The home gateway method as described in one of supplementary notes 7-9 wherein, as the conversion, the conversion unit performs conversion for at least one of a codec, a bit rate, a screen resolution, a frame rate, a file format, and a protocol in real time.

(Supplementary Note 11)
The home gateway method as described in one of supplementary notes 7-10 wherein the terminal includes at least one of a mobile phone, a PHS (Personal Handyphone System), a wireless LAN (Local Area Network) terminal, a WiMAX (Worldwide Interoperability for Microwave Access) terminal, a personal computer, a game machine, and a digital photo frame.

(Supplementary Note 12)
A program that causes a computer, which configures a home gateway installed in a home, to perform the processing of:
when a predetermined request is received from a terminal via a network,
identifying a type of the terminal;
reading a stream or a file, which includes at least one of a video or an audio, from at least one of an equipment connected directly to the gateway and an equipment connected to the gateway via a home network;
creating conversion information corresponding to the type of the terminal; and
performing conversion for the stream or the file, which has been read, in accordance with the conversion information and transmitting the converted stream or file to the terminal.

(Supplementary Note 13)
A program that causes a computer, which configures a home gateway installed in a home, to perform the processing of:
when a predetermined request is received from a terminal via a network and a femto-cell access point installed in the home,
identifying a type of the terminal;
reading a stream or a file, which includes at least one of a video or an audio, from at least one of an equipment connected directly to the home gateway and an equipment connected to the home gateway via a home network;
creating conversion information corresponding to the type of the terminal; and
performing conversion for the stream or the file, which has been read, in accordance with the conversion information and transmitting the converted stream or file to the terminal.

(Supplementary Note 14)
The program as described in supplementary note 12 or 13, further comprising the processing of:
for each model type of a terminal, holding capability information on the terminal including at least one of
an allowable codec,
a screen resolution,
a frame rate,
a file format and a file size receivable by the terminal, and
a reception protocol of the terminal; and
reading the capability information on the terminal corresponding to the model type of the terminal and creating conversion information corresponding to the capability information.

(Supplementary Note 15)
The program as described in supplementary note 12 or 13 wherein, as the conversion processing, at least one of a codec, a bit rate, a screen resolution, a frame rate, a file format, and a protocol is converted in real time.

(Supplementary Note 16)
The program as described in one of supplementary notes 12-14 wherein the terminal includes at least one of a mobile phone, a PHS (Personal Handyphone System), a wireless LAN (Local Area Network) terminal, a WiMAX (Worldwide Interoperability for Microwave Access) terminal, a personal computer, a game machine, and a digital photo frame.

(Supplementary Note 17)
A gateway apparatus installed on a network, comprising:
a conversion unit that,
when a predetermined request is received from a mobile terminal via a network that is different from, or the same as, the network, identifies a type of the mobile terminal and transmits the request to a home gateway installed in a home,
reads a stream or a file, which includes at least one of a video and an audio, from at least one of an equipment connected directly to the home gateway and an equipment connected to the home gateway via a home network, and
creates conversion information corresponding to at least one of the type of the mobile terminal and characteristics of the network, performs conversion for the stream or the file in accordance with the conversion information, and transmits the converted stream or file to the mobile terminal.

(Supplementary Note 18)
A gateway apparatus installed on a network, comprising:
a conversion unit that,
when a predetermined request is received from a mobile terminal, identifies a type of the mobile terminal and transmits the request to a wireless home gateway via a femto-cell access point provided in a home,
reads a stream or a file, which includes at least one of a video and an audio, from at least one of an equipment connected directly to the home gateway or the set-top box and an equipment connected to the home gateway or the set-top box via a home network, via the wireless home gateway and the femto-cell access point,
creates conversion information corresponding to at least one of the type of the terminal and characteristics of the network, and
performs conversion for the stream or the file in accordance with the conversion information and transmits the converted stream or file to the mobile terminal.

(Supplementary Note 19)
The gateway apparatus as described in supplementary note 17, comprising:
a control signal conversion unit that, when a request command is received from the mobile terminal, reads terminal type information from the request command to identify the terminal type of the mobile terminal, converts the request command, received from the mobile terminal, to a message for the home gateway and transmits the message to the home gateway and, at the same time, transmits a content selection result to the home gateway;
a packet reception unit that receives packets that include content information acquired from the apparatus and transmitted via the home gateway;
a conversion instruction unit that receives the terminal type information from the control signal conversion unit, receives the content information, transmitted from the home gateway, from the packet reception unit, and instructs the transcoder unit to perform conversion;
a transcoder unit that receives an extracted stream from the packet reception unit and performs the transcode processing corresponding to the conversion instruction received from the conversion instruction unit;
a file conversion unit that receives the terminal type information on the mobile terminal from the conversion instruction unit, receives the converted stream from the transcoder unit 3, and converts the stream to a file format for transmission to the mobile terminal according to the terminal type information;
a protocol conversion unit that receives the terminal type information on the mobile terminal, acquired by the control signal conversion unit, from the conversion instruction unit, receives a file from the file conversion unit, determines the protocol by which the mobile terminal can receive the file, and transmits the file using the protocol; and
a packet transmission unit that receives the terminal type information from the conversion instruction unit, receives the address of the mobile terminal, receives the protocol and the file, format from the protocol conversion unit, and transmits the packets to the mobile terminal.

(Supplementary Note 20)
A gateway method comprising the steps, by a gateway apparatus installed on a network, of:
when a predetermined request is received from a mobile terminal via a network that is different from, or the same as, the network, identifying a type of the mobile terminal and transmitting the request to a home gateway installed in a home;
reading a stream or a file, which includes at least one of a video and an audio, from at least one of an equipment connected directly to the home gateway and an equipment connected to the home gateway via a home network; and
creating conversion information corresponding to at least one of the type of the mobile terminal and characteristics of the network, performing conversion for the stream or the file in accordance with the conversion information, and transmitting the converted stream or file to the mobile terminal.

(Supplementary Note 21)
A gateway method comprising the steps, by a gateway apparatus installed on a network, of:
when a predetermined request is received from a mobile terminal, identifying a type of the mobile terminal and transmitting the request to a wireless home gateway via a femto-cell access point provided in a home;
reading a stream or a file, which includes at least one of a video and an audio, from at least one of an equipment connected directly to the home gateway or the set-top box and an equipment connected to the home gateway or the set-top box via a home network, via the wireless home gateway and the femto-cell access point;
creating conversion information corresponding to at least one of the type of the mobile terminal and characteristics of the network; and
performing conversion for the stream or the file in accordance with the conversion information and transmitting the converted stream or file to the mobile terminal.

(Supplementary Note 22)
A program that causes a computer, which configures a gateway apparatus installed on a network, to perform the processing of:
when a predetermined request is received from a mobile terminal via a network that is different from, or the same as, the network, identifying a type of the mobile terminal and transmitting the request to a home gateway installed in a home;
reading a stream or a file, which includes at least one of a video and an audio, from at least one of an equipment connected directly to the home gateway and an equipment connected to the home gateway via a home network; and
creating conversion information corresponding to at least one of the type of the mobile terminal and characteristics of the network, performing conversion for the stream or the file in accordance with the conversion information, and transmitting the converted stream or file to the mobile terminal.

(Supplementary Note 23)
A program that causes a computer, which configures a gateway apparatus installed on a network, to perform the processing of:
when a predetermined request is received from a mobile terminal, identifying a type of the mobile terminal and transmitting the request to a wireless home gateway via a femto-cell access point provided in a home;
reading a stream or a file, which includes at least one of a video and an audio, from at least one of an equipment connected directly to the home gateway or the set-top box and an equipment connected to the home gateway or the set-top box via a home network, via the wireless home gateway and the femto-cell access point;
creating conversion information corresponding to at least one of the type of the terminal and characteristics of the network; and
performing conversion for the stream or the file in accordance with the conversion information and transmitting the converted stream or file to the mobile terminal.

What is claimed is:

1. A gateway apparatus comprising:
a control signal conversion unit that receives a selection result of a content from a server, the server being accessed by a terminal via a network for authentication to select the content,
the control signal conversion unit, on reception of a predetermined request from the terminal via a network that is different from, or the same as, a network on which the gateway apparatus is installed, identifying a type of the terminal to transmit the request including information on the content selected to a home gateway installed in a home via at least the network on which the gateway apparatus is installed;
a reception unit that receives, via the home gateway, a stream or a file, which is the content selected by the terminal, includes at least one of a video and an audio, and is read from at least one of an equipment arranged in the home and connected directly to the home gateway and an equipment arranged in the home and connected to the home gateway via a home network arranged in the home;
a conversion instruction unit that creates conversion information corresponding to the type of the terminal;
a conversion unit that performs conversion for the stream or the file in accordance with the conversion information; and
a transmission unit that transmits the converted stream or file to the terminal via the network that is different from, or the same as, the network on which the gateway apparatus is installed.

2. The gateway apparatus according to claim 1, wherein the control signal conversion unit, in response to a predetermined request received from the terminal, identifies a type of the terminal and transmits the request to a wireless home gateway via a femto-cell access point provided in a home,
the reception unit receives a stream or a file, which is a content specified by the terminal, includes at least one of a video and an audio, and is read from at least one of an equipment connected directly to the wireless home gateway or a set-top box and an equipment connected to the wireless home gateway or the set-top box via a network, via the wireless home gateway and the femto-cell access point,
the conversion instruction unit creates conversion information corresponding to the type of the terminal, and
the conversion unit performs conversion for the stream or the file in accordance with the conversion information, and
the transmission unit transmits the converted stream or file to the terminal.

3. A network system comprising:
a terminal;
a gateway apparatus according to claim 1, the gateway being installed on a network;
a home gateway installed in a home; and
an equipment connected directly to the home gateway and/or an equipment connected indirectly to the home gateway via a network, wherein when a predetermined request is received from the terminal via a network that is different from, or the same as, the network.

4. The gateway apparatus according to claim 1, comprising a table that for each model type of a terminal, holds capability information on the terminal including at least one of
an allowable codec;
a screen resolution;
a frame rate;
a file format and a file size receivable by the terminal; and
a reception protocol of the terminal, wherein
the conversion instruction unit reads the capability information corresponding to the model type of the terminal from the table and creates conversion information corresponding to the capability information.

* * * * *